US012024221B2

(12) United States Patent
Huber et al.

(10) Patent No.: US 12,024,221 B2
(45) Date of Patent: Jul. 2, 2024

(54) ADJUSTMENT DRIVE FOR A STEERING COLUMN AND STEERING COLUMN FOR A MOTOR VEHICLE

(71) Applicants: thyssenkrupp Presta AG, Eschen (LI); thyssenkrupp AG, Essen (DE)

(72) Inventors: Sebastian Huber, Goefis (AT); Jean-Pierre Specht, Haag (CH)

(73) Assignees: thyssenkrupp Presta AG, Eschen (LI); thyssenkrupp AG, Essen (DE)

( * ) Notice: Subject to any disclaimer, the term of this patent is extended or adjusted under 35 U.S.C. 154(b) by 0 days.

(21) Appl. No.: 18/102,298

(22) Filed: Jan. 27, 2023

(65) Prior Publication Data

US 2023/0264732 A1    Aug. 24, 2023

(30) Foreign Application Priority Data

Feb. 22, 2022 (EP) .................................. 22157933

(51) Int. Cl.
  *B62D 1/181*    (2006.01)
  *B62D 1/185*    (2006.01)
  *F16H 25/24*    (2006.01)

(52) U.S. Cl.
  CPC ............. *B62D 1/181* (2013.01); *B62D 1/185* (2013.01); *F16H 25/2409* (2013.01)

(58) Field of Classification Search
  CPC ..... B62D 1/181; B62D 1/185; F16H 25/2409; F16H 2025/249; F16H 25/24; F16H 57/0464; F16H 57/0497
  See application file for complete search history.

(56) References Cited

U.S. PATENT DOCUMENTS

2021/0179163 A1\*  6/2021  Tomimatsu .............. B62D 1/20

FOREIGN PATENT DOCUMENTS

| CN | 112977597 A | \* | 6/2021 | ............. B62D 1/185 |
| CN | 115956171 A | \* | 4/2023 | ............. F16D 65/14 |
| DE | 10 2017 207 561 A1 | | 7/2017 | |
| DE | 102020202196 A1 | \* | 8/2021 | ............. B62D 1/181 |
| DE | 102020202196 A1 | | 8/2021 | |
| WO | WO-2017139627 A1 | \* | 8/2017 | ............. B62D 1/181 |
| WO | WO-2020031637 A1 | \* | 2/2020 | ............... B21H 3/04 |
| WO | WO-2020078877 A1 | \* | 4/2020 | ............. B62D 1/181 |

OTHER PUBLICATIONS

"Dual-core steering software architecture", Third Party Observation in EP Publication No. EP 4230502 (Mar. 10, 2023).
"Monitoring external mechanical impacts in steer-by-wire system", Third Party Observation in EP Publication No. EP 4230502 (2023).

\* cited by examiner

*Primary Examiner* — Drew J Brown
(74) *Attorney, Agent, or Firm* — thyssenkrupp North America, LLC

(57) ABSTRACT

An adjustment drive for a steering column of a motor vehicle may include a threaded spindle having an external thread, engaging with a corresponding internal thread of a spindle nut. A thread tooth of the external thread and a thread groove of the internal thread have corresponding axially sliding thread flanks that are braced against each other. At least one thread flank comprises at least one recessed lubricant uptake.

19 Claims, 4 Drawing Sheets

ADJUSTMENT DRIVE FOR A STEERING COLUMN AND STEERING COLUMN FOR A MOTOR VEHICLE

CROSS REFERENCE TO RELATED APPLICATION

This application is a U.S. Non-Provisional that claims priority to European Patent Application No. EP 22157933.7, filed Feb. 22, 2022, the entire content of which is incorporated herein by reference.

FIELD

The present disclosure generally relates to steering, including steering systems and adjustment drives for steering columns of motor vehicles.

BACKGROUND

A motorized adjustable steering column is held in its front region in the driving direction on the vehicle chassis by a supporting mechanism. In the rear end region, facing toward the driver position, there is arranged a steering input for the manual inputting of steering commands, for example to a steering wheel which can turn about a longitudinal axis. The steering wheel can be arranged on a steering spindle, mounted in an actuator so that it can turn about the longitudinal axis, being accommodated in a casing unit, also called a guide box, an outer casing tube, or a box swing arm, such that it can be moved in telescopic manner in the lengthwise direction, dictated by the longitudinal axis, in order to realize a lengthwise adjustment of the steering input relative to the driver position.

A height adjustment of the steering input can be realized in that the actuator or a casing unit which holds it transverse to the longitudinal axis is mounted so that it can pivot upward and downward relative to the vehicle chassis.

It is known in the prior art how to provide for adjustment a motorized adjustment drive with a drive unit having a drive motor, which is connected—generally across a gearing—to a spindle drive, comprising a threaded spindle engaging with a spindle nut. Thanks to the drive unit, the threaded spindle and the spindle nut can be driven against each other, rotating about the spindle axis, and in this way they can be moved toward or away from each other in translation, depending on the direction of rotation, in the direction of the spindle axis. In one configuration, the so-called rotation spindle drive, the threaded spindle can be driven in rotation about its spindle axis by the drive unit, which is connected in a stationary manner to the actuator or the support unit, and it engages with the spindle nut, which is mounted in a stationary manner on the adjustable support unit or the actuator in terms of rotation about the spindle axis. The threaded spindle is braced axially, i.e., in the direction of the spindle axis, against the support unit or the actuator, and the spindle nut is braced accordingly against the actuator or the support unit, so that a rotational driving of the threaded spindle brings about a translatory movement of the support unit and the actuator relative to each other. In an alternative configuration, known as a plunger spindle drive, the threaded spindle is coupled immovably to the support unit or the actuator in terms of rotation about the spindle axis and the spindle nut can rotate, but it is accordingly mounted stationary on the actuator or the support unit in the direction of the spindle axis. As in the first configuration, the threaded spindle is braced axially in the direction of the spindle axis against the support unit or the actuator, and the spindle nut is accordingly braced against the actuator or the support unit, so that the threaded spindle can be moved in translation by the drive unit in the direction of the spindle axis. In both configurations, the adjustment drive has a motorized drivable spindle drive acting between the support unit and the actuator, which can move the actuator relative to the support unit. An adjustment drive of this kind is described for example in DE 10 2017 207 561 A1.

In order to realize a lengthwise movement of the actuator in the direction of the longitudinal axis, a spindle drive of an adjustment drive can be arranged between the actuator and a casing unit which accommodates it in an axially lengthwise movable manner, being connected to the support unit, and the spindle axis can be oriented substantially parallel to the longitudinal axis.

For the height adjustment, an adjustment drive can be arranged between the support unit and an actuator mounted thereon in height adjustable manner.

A motorized length and height adjustment can be formed on a steering column, either singly or in combination.

In the spindle drive, the thread flanks lying axially against each other, namely, the tooth flanks on the thread tooth of the external thread of the threaded spindle and the corresponding groove flanks in the thread groove of the internal thread, are stressed against each other with the axial movement force and slide relative to each other upon movement in the peripheral direction. In order to reduce the friction losses and the wear and tear, a lubricant, usually grease, is introduced in order to lessen the friction. The lubricant adheres to the threaded spindle and the spindle nut. In this way, the contact regions in sliding contact on the thread flanks of the thread are adequately lubricated almost throughout the entire service life during the movement to adjust the steering wheel position. A more frequent adjustment occurs for example in the case of autonomous driving, since the steering column when switching between manual and autonomous driving modes is moved from the operating position to a stowage position, and vice versa. Such an automated adjustment is also realized in conventional driving operation in order to improve the comfort when getting in or leaving the vehicle.

Due to the frequent activation, the lubricant can be displaced from the thread flanks in immediate frictional contact between the thread tooth and the corresponding thread groove, and collect at a different location of the spindle drive. This may impair the lubrication, and increased friction and wear may occur.

Thus a need exists to improve lubrication and lessen friction and wear.

DETAILED DESCRIPTION

Figure 1:
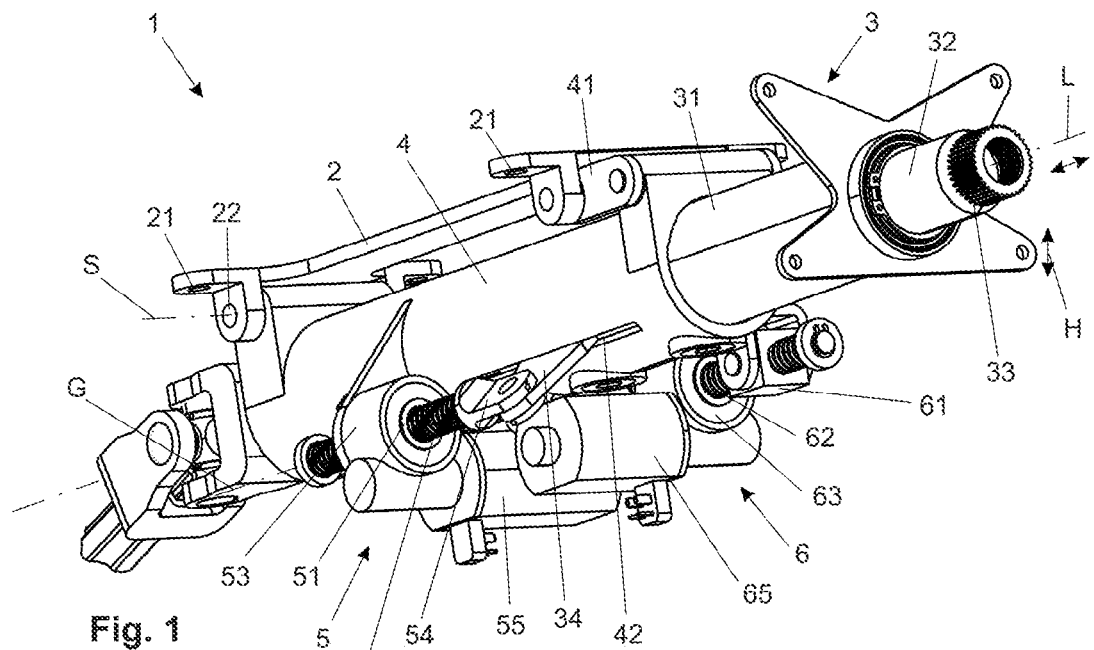
FIG. 1 is a schematic perspective view of an example steering column.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

One example adjustment drive for a steering column for a motor vehicle may comprise a threaded spindle having an external thread, engaging with a corresponding internal thread of a spindle nut. A thread tooth of the external thread and a thread groove of the internal thread may have corresponding axially sliding thread flanks that are braced against each other. At least one thread flank comprises at least one recessed lubricant uptake. Another aspect of the present disclosure concerns a steering column having such an adjustment drive.

The external thread has a screw-shaped, helically encircling thread tooth for at least a portion, having a tooth flank on both of its axial surfaces as a thread flank. The thread groove of the internal thread has groove flanks on both sides axially, representing thread flanks corresponding to the tooth flanks. Depending on the direction of movement, the frictional pairing is loaded with the axial adjustment force of the adjustment drive in the contact region of corresponding thread flanks. It is possible for the thread flanks configured according to the present disclosure to have a tooth flank of the thread tooth and/or a groove flank of a thread groove.

According to the present disclosure, a lubricant uptake, which can also be called a lubricant uptake indentation, can be formed as a recess or concave indentation, for example in the form of a lubricant pocket or trough. The lubricant uptake is introduced into the surface of the thread flank, also known as a flank surface, in the contact region where the tooth flank and the groove flank can come into sliding contact during the threaded engagement. Because the lubricant uptake can be filled at least partially with a lubricant, it forms an open lubricant reservoir, i.e., a lubricant accumulator, which is situated in the contact region of the thread flank.

One advantage of the present disclosure is that a greater lubricant stockpile can be stored in the lubricant reservoir, from which lubricant can be dispensed directly into the contact region between the thread flanks which are in frictional contact with each other there. Because the lubricating film is relatively thin in the contact region, and also only the lubricant squeezed out by the axial loading has to be replaced, the lubricant held in the lubricant uptake according to the present disclosure can assure a sufficient long-lasting lubrication of the spindle drive, preferably for the entire service life. This also holds for applications with especially frequent movement of the steering column, such as a steer-by-wire steering column for autonomous driving operation, or other automated comfort functions. In this way, the friction and wear are effectively reduced, so that a long-lasting trouble-free operation is assured.

In operation, the lubricant uptake is filled with a lubricant, preferably a grease. The lubricant can have an adapted higher viscosity, so that under the usually anticipated operating conditions an adequate, but not too large quantity of lubricant can always get into the contact region from the lubricant uptake. The filling with lubricant can preferably occur already during the assembly of the adjustment drive, so that a long-lasting trouble-free operation can be assured.

It is advantageous for the lubricant uptake to be formed open axially at one end, thereby forming a concave indentation or recess, only having an opening toward the contact region of the thread flank. This opening is covered or closed in the threaded engagement by the axially oppositely situated thread flank lying against it in sliding manner in the contact region. For example, a lubricant uptake formed in a tooth flank is covered by the corresponding groove flank. This ensures that the lubricant can get in between the thread flanks in a reliable and graduated manner.

It can be provided that each time a plurality of lubricant uptakes is formed in a thread flank. For example, multiple lubricant uptakes can be distributed in the peripheral direction over the entire length of the threaded spindle which can come into engagement with the spindle nut during the movement, each of them having a spacing relative to each other. This can assure a uniform and reliable distribution of the lubricant.

One preferred embodiment can be realized in that the lubricant uptake comprises an elongated lubrication groove. A lubrication groove forms an open lubricating duct, which can be formed as a channel or groove in a thread flank. One advantage here is that the lubricant can be dispensed over a larger contact region thanks to the elongated shape in the peripheral direction and/or in the radial direction. The lubricant can be distributed along the inside of the lubrication groove, so that a more uniform and reliable lubrication occurs even under heavy workload.

One advantageous modification of the aforementioned embodiment is that the lubrication groove is spiral shaped at least for a portion. In the spiral course, the lubrication groove extends curved in the radial direction towards the longitudinal axis of the spindle or the thread. The lubrication groove can be formed in the helical axial surface formed by the thread flank similar to a threaded groove of a flat thread in the shape of an arc running radially from the inside to the outside. On the external thread, a lubrication groove can extend from the base circle of the external thread of the threaded spindle, corresponding to the core diameter of the external thread, preferably to the tooth tip, corresponding to the outer diameter of the external thread, i.e., along the radial height of the thread tooth. Similarly, a lubrication groove can run in the internal thread of the spindle nut from the base circle of the thread groove in the groove flank, i.e., radially inward as an arc from the outer diameter, preferably as far as the inner diameter of the internal thread, i.e., along the radial height of the thread groove. One advantage is that a thread groove can supply a larger peripheral and radial section of the contact surface with lubricant. Another advantage is that the lubricant is delivered in the radial direction in the lubrication groove upon relative rotation of the threaded spindle and the spindle nut in a given direction of turning, similar to the working principle of a spiral pump. Depending on the direction of rotation and turning of the spiral shape, lubricant can be pumped radially from the inside to the outside or vice versa. This makes possible an optimized distribution of the lubricant. In particular, lubricant which has been pressed radially out from the contact region in the course of the operating time can be brought back once more for lubrication in the contact region through the spiral lubrication groove. In this way, lubricant loss can be decreased and a long-lasting, optimized lubrication can be realized.

The spiral trend can preferably be such that a lubrication groove extends in a partial peripheral section of less than 360° over the radial height of the thread tooth or the thread groove. In this way, two or more lubrication grooves can preferably be arranged distributed with spacing in the peripheral direction per revolution. Each lubrication groove here can be formed like a spiral arm.

Preferably, a plurality of spiral lubrication grooves can be distributed over the entire length of the external thread and/or the internal thread.

Furthermore, it may be advantageous to form two lubrication grooves with spiral shape in opposite directions. For example, the first lubrication groove can run in a spiral from inside to outside during one turn of a rotation, for example in the clockwise direction, and the other opposite lubrication groove runs from outside to inside in the same rotation direction. During a relative turning of the threaded spindle and the spindle nut in a given direction of rotation, the lubricant can be delivered from inside to outside into the one lubrication groove, and at the same time from the outside to the inside in the other opposite lubrication groove. In this way, lubricant having gotten out of the contact region both radially inward and outward can be taken back to the contact region once more, so that the lubrication is further optimized.

Oppositely directed lubrication grooves can be formed each time on a thread tooth or a thread groove, or also on a thread tooth opposite to a corresponding thread groove. In particular, it is conceivable and possible for oppositely directed lubrication grooves to be arranged on tooth and groove flanks lying against each other in sliding contact.

It is possible for lubricant uptakes to be arranged on one or both tooth flanks of a thread tooth and/or on one or both groove flanks of a thread groove. Because, according to the present disclosure, lubricant uptakes are realized optionally only on the thread tooth or in the thread groove, or on the thread tooth and on the thread groove, the lubricant distribution can be adapted to the particular requirements. In addition, lubricant uptakes can be provided optionally on one or both sides axially on the thread flanks of the thread groove and the thread tooth. In this way, a further optimization of the lubricant distribution becomes possible, for example, in order to keep it in the region of the internal thread.

The tooth tip, which is bounded by the preferably cylindrical outer peripheral surface of the threaded spindle, is preferably smooth in configuration over the length of the threaded spindle and has no radial indentations or the like. In this way, excessive lubricant can be prevented from collecting outside the thread flanks radially between the tooth tip of the thread tooth and the groove bottom of the thread groove.

Preferably, the threaded spindle and/or the spindle nut can comprise a plastic. The threaded spindle can be formed from plastic at least for a portion in the region of the thread tooth, and/or the spindle nut can be so formed in the region of the thread groove. Advantageous sliding properties can be realized in this way. Advantageous is a production from a thermoplastic polymer in plastic injection moulding. This makes possible an easy realization of the lubricant uptakes in the manufacturing process. For example, lubrication grooves can be formed in a thread tooth or a thread groove by means of a moulding die of relatively simple design, allowing an easy forced removal of the finished injection moulded piece from an injection moulding die, which can be designed in theory exactly as simple as the prior art with no lubricant uptakes according to the present disclosure.

In addition or alternatively, it can be provided that the threaded spindle and/or the spindle nut comprise a metallic material. The threaded spindle can be formed at least for a portion of a metallic material in the region of the thread tooth, and/or the spindle nut can be so formed in the region of the thread groove, for example, from steel or non-ferrous metal.

The threaded spindle and/or the spindle nut can comprise a core of a metallic material, which is coated with a plastic at least for a portion in the region of the tooth flanks or groove flanks. For example, such a metal core can be overmoulded with a thermoplastic polymer in the region of the thread. In this way, good rigidity with low friction can be achieved.

In this way, a friction and wear-optimized material pairing can be realized between the thread flanks lying against each other, preferably as a metal/plastic combination or a plastic/plastic combination.

In order to realize an automated adjustment, it is preferably provided that a motorized drive unit is coupled to the threaded spindle or the spindle nut such that the threaded spindle and the spindle nut can be driven in rotation relative to each other. The drive unit comprises an electric motor, which is coupled to the threaded spindle or the spindle nut for the rotating drive, for example across a worm gear or the like. The electric actuation of the motor by a control unit of the motor vehicle makes possible an automated adjustment.

In a steering column for a motor vehicle, having a support unit, which can be mounted on a vehicle chassis, and by which an actuator is supported, in which a steering spindle is rotatably mounted, and having an adjustment drive, comprising a threaded spindle, engaging with an external thread in a spindle nut, and a drive unit, which is coupled to the threaded spindle or the spindle nut such that the threaded spindle and the spindle nut can be driven in rotation relative to each other, wherein the adjustment drive is connected to the support unit or the actuator, it is proposed according to the present disclosure that the adjustment drive is configured according to one of the above described embodiments or combinations thereof.

Thanks to the configuration of the adjustment drive or drives according to the present disclosure, a reliable and maintenance-free operation can be realized over the service life of the steering column, also in particular when frequent adjustment occurs.

The adjustment drive can be configured in known manner as a rotation spindle drive or as a plunger spindle drive in order to adapt to the given circumstances.

Advantageously, the steering column according to the present disclosure is configured as a steer-by-wire steering column. This involves an electrical steering input device, in which the manual steering is not mechanically connected to the wheels being steered, but instead cooperates with angle or torque sensors which detect the manually entered steering command and generate from this an electric control signal and apply this to a steering adjuster, which establishes a steering deflection of the wheels corresponding to the steering command by means of an electric adjustment drive. Such steering systems can be used preferably in autonomously operated vehicles.

Figure 2:
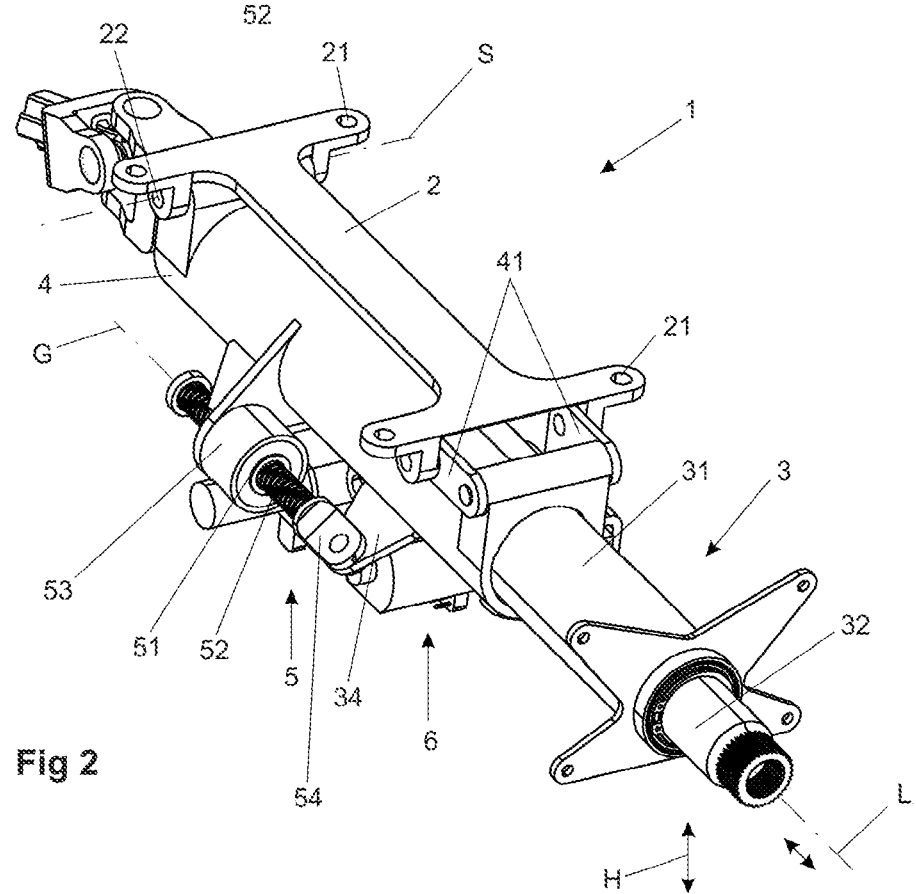
FIG. 2 is another perspective view of the steering column from FIG. 1.

FIG. 1 shows a steering column 1 according to the present disclosure in a schematic perspective view looking at a slant from bottom left at the rear end, in terms of the driving direction of a vehicle not shown, where at the right side of the figure a steering wheel not shown here is held in the operating region. FIG. 2 shows the steering column 1 in a view from the opposite side, i.e., looking from upper left.

The steering column 1 comprises a support unit 2, formed as a bracket, having fastening means 21 in the form of mounting boreholes, for mounting on a vehicle chassis, not shown. The support unit 2 holds an actuator 3, which is accommodated in a casing unit 4—also called a guide box or box swing arm.

The actuator 3 comprises a casing tube 31, in which a steering spindle 32 is rotatably mounted about a longitudinal axis L, extending axially in the lengthwise direction, i.e., in the direction of the longitudinal axis L. At the rear end, a fastening section 33 is formed on the steering spindle 32, where a steering wheel, not shown, can be mounted.

The actuator 3 is accommodated in the casing unit 4 such as to be telescopically movable in the direction of the longitudinal axis L in order to realize a lengthwise adjustment and to position the steering wheel, connected to the steering spindle 32, back and forth in the lengthwise direction relative to the support unit 2, as indicated by the double arrow parallel to the longitudinal axis L.

The casing unit 4 is mounted in a swivel bearing 22 on the support unit 2 so that it can swivel about a horizontal swivel axis S lying transversely to the longitudinal axis L. In the rear region, the casing unit 4 is connected by an adjusting lever 41 to the support unit 2. By turning the adjusting lever 41, the casing unit 4 can be swivelled relative to the support unit 2 about the swivel axis S, which is horizontal in the installed condition, so that a steering wheel mounted on the fastening section 33 can be moved in the vertical direction H, as indicated by the double arrow.

A first adjustment drive 5 for lengthwise movement of the actuator 3 relative to the casing unit 4 in the direction of the longitudinal axis L comprises a spindle drive having a spindle nut 51, in which a threaded spindle 52 engages, extending along a thread axis G, of the spindle axis, i.e., it is screwed by its external thread into the corresponding internal thread of the spindle nut 51. The thread axis G runs substantially parallel to the longitudinal axis L.

The spindle nut 51 is mounted in a bearing housing 53, connected firmly to the casing unit 4, and it can turn about the thread axis G. In the direction of the thread axis G, the spindle nut 51 is braced axially across the bearing housing 53 against the casing unit 4. The adjustment drive 5 is accordingly a so-called plunger spindle drive.

The threaded spindle 52 is connected to the actuator 3 by a fastening element 54 formed at its rear end, across a transmission element 34, being firm in the direction of the axis G or the longitudinal axis L and stationary in terms of rotation about the axis G. A so-called plunger spindle drive is realized by the spindle nut 51 driven in rotation and the threaded spindle 52 which is stationary in terms of rotation.

The transmission element 34 extends from the actuator 3 through a slotlike through-passage opening 42 in the casing unit 4. For the movement of the steering column 1 in the lengthwise direction, the transmission element 34 can be moved freely in the through-passage opening 42 along the lengthwise direction.

The adjustment drive 5 comprises an electric drive motor 55, which can drive the spindle nut 51 in rotation with respect to the axis G relative to the stationary threaded spindle 52. In this way—depending on the direction of rotation of the drive motor 55—the threaded spindle 52 can be moved in translation relative to the spindle nut 51 in the direction of the thread axis G, so that the actuator 3 connected to the threaded spindle 52 can be moved accordingly in the direction of the longitudinal axis L relative to the casing unit 4 connected to the spindle nut 51.

It can further be noticed in FIG. 1 how a second adjustment drive 6 is mounted on the steering column 1 for movement in the vertical direction H. This adjustment drive 6 comprises a spindle nut 61, in which a threaded spindle 62 engages. The threaded spindle 62 is mounted movably about the axis G in a bearing housing 63, which is fastened on the casing unit 4, and braced axially against the casing unit 4, and it can be driven in rotation by an electric drive motor 65 optionally in both rotation directions about the axis G. Accordingly, the adjustment drive 6 is a so-called rotation spindle drive.

The spindle nut 61 is mounted stationary in terms of rotation about its thread axis on the adjusting lever 41, which is mounted on the support unit 2 rotatably about a swivel bearing, and its other arm is connected by the other end to the casing unit 4.

By rotation of the threaded spindle 61, the spindle nut 61 can be moved in translation relative to the threaded spindle 52—depending on the direction of turning of the drive motor 65—so that the casing unit 4 connected to the spindle nut 41 by the adjusting lever 41 plus the actuator 3 received therein can accordingly be moved up or down in the vertical direction H relative to the support unit 2, as indicated by the double arrow.

Figure 3:
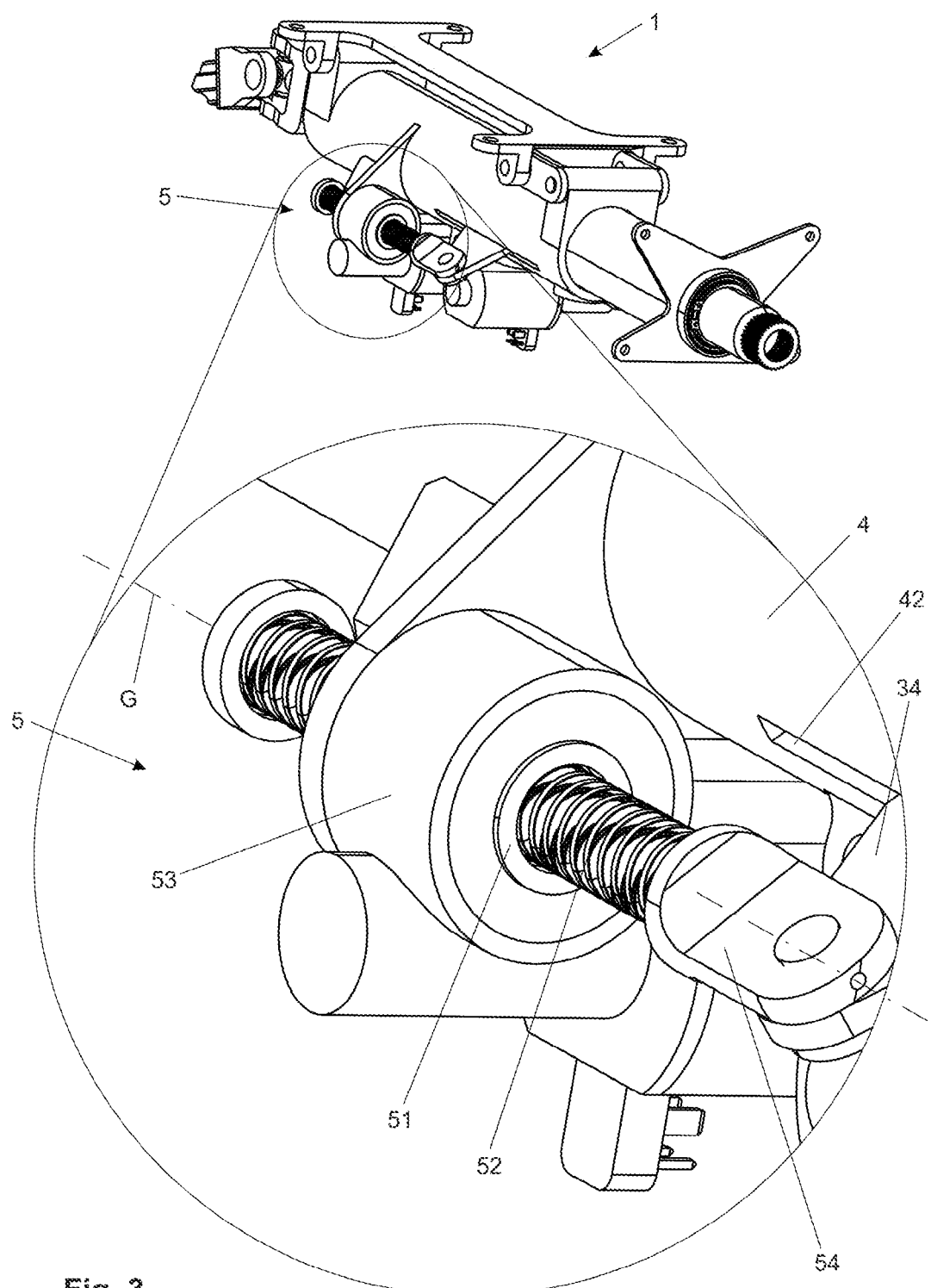
FIG. 3 is a schematic, perspective view of an example adjustment drive.
Figure 4:
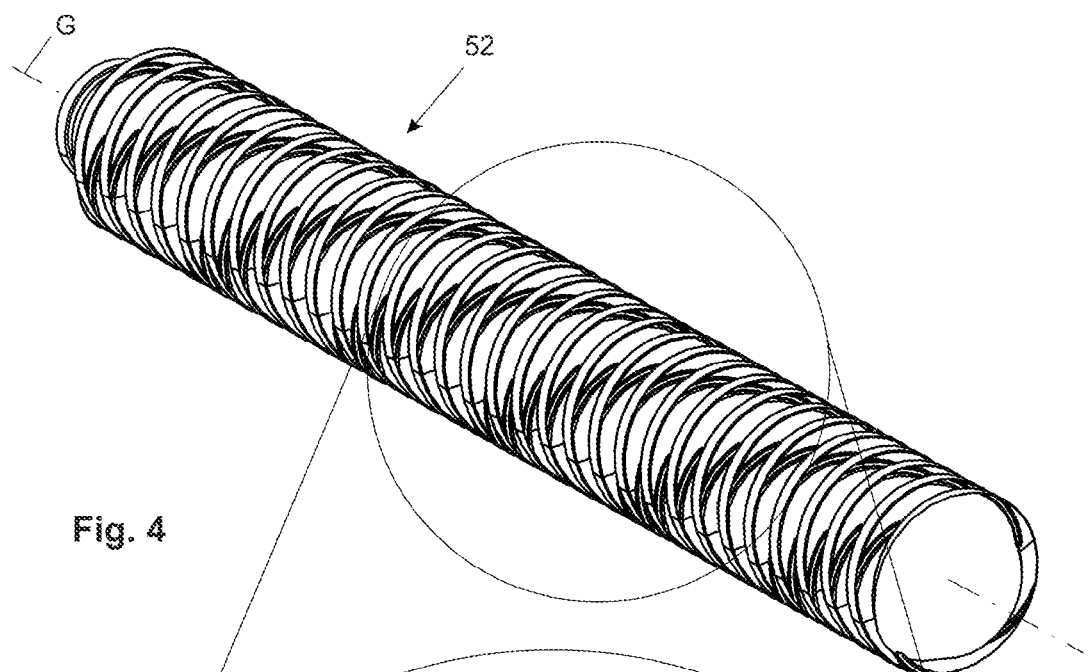
FIG. 4 is a perspective view of an example threaded spindle.
Figure 5:
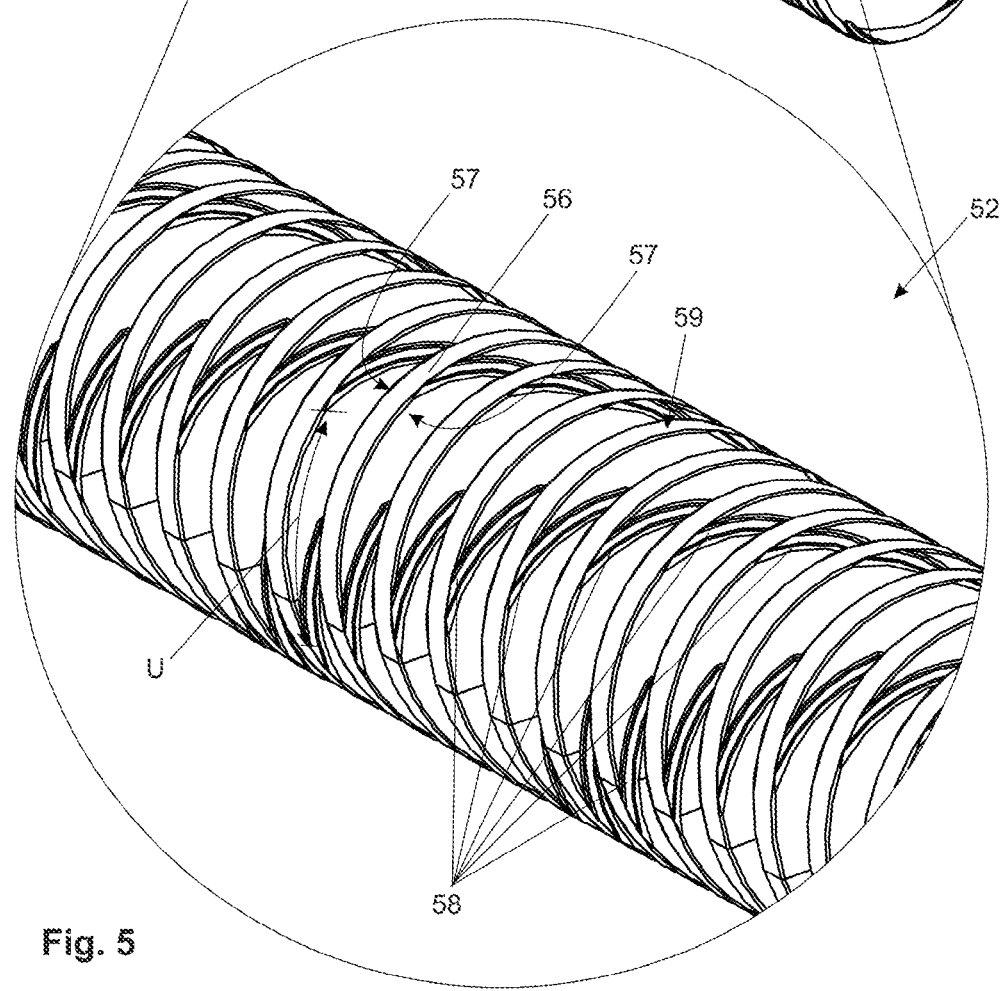
FIG. 5 is an enlarged perspective view of an example threaded spindle.

FIG. 3 shows the adjustment drive 5 configured as a plunger spindle drive in enlarged representation. FIG. 4 shows the threaded spindle 51 released separately according to the present disclosure in an enlarged representation, and FIG. 5 shows a further enlarged detail representation of FIG. 4.

The threaded spindle 51 has a helically encircling thread tooth 56. This has two axial thread flanks 57, forming the tooth flanks. The thread flank 57 facing toward the viewer in FIG. 5 has a plurality of lubrication grooves 58, which form channel-shaped, concave indented lubricant uptakes in the sense of the present disclosure.

The lubrication grooves 58 each have a spacing U from each other, measured across the outer diameter of the threaded spindle 51 in the peripheral direction. In the example shown, all the lubrication grooves 56 distributed over the lengthwise extension of the threaded spindle have the same spacings U. But it is also conceivable and possible to provide different spacings U.

The tooth tip 590, which is bounded by the cylindrical outer peripheral surface of the threaded spindle 51, has no radial indentations.

Figure 6:
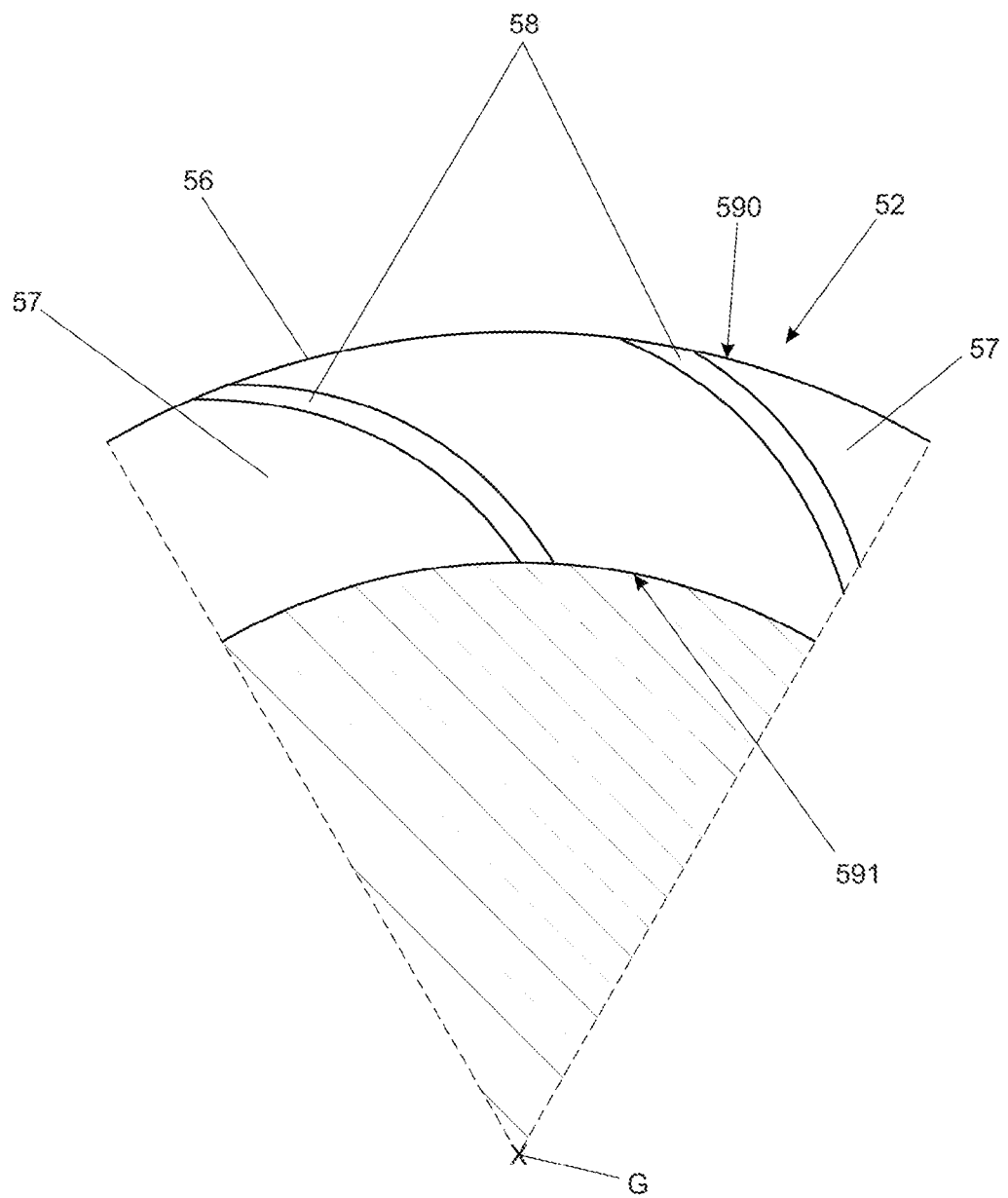
FIG. 6 is a partial view, sectioned by a longitudinal axis, of an example threaded spindle.

FIG. 6 shows a schematic axial partial view of a peripheral section of the tooth flank 57. The arc-shaped, spiral trend of the lubrication grooves 58 can be recognized here. In other words, they are shaped like spiral arms, each of them having a spacing U in the peripheral direction—as indicated in FIG. 5. In the example shown, they run from the tooth base 591 to the tooth tip 590 along the entire radial height of the thread tooth 56. In their trend, they are curved in an arc radially from the inside to the outside in counter clockwise direction.

In the installed and ready to operate state of the adjustment drive 5, the lubrication grooves 58 are at least partly filled with a lubricant, preferably a grease.

It is possible to form lubrication grooves 58 or other shaped lubricant uptakes in the sense of the present disclosure also on the axial tooth flank 57 facing away from the viewer in FIGS. 4 and 5.

In addition or alternatively, basically similar lubrication grooves 58 can be formed in the groove flanks of the thread groove of the internal thread of the spindle nut 51, not shown here.

The threaded spindle 52 and the spindle nut 51 can be formed from a metallic material, and/or from a plastic. Advantageously, the threaded spindle 52 is formed from a plastic, preferably a thermoplastic polymer, at least in the region of the tooth flank 57 of the thread tooth 56. This can be formed as an injection moulded piece, which is used for overmoulding of a metallic core, for example. The lubrication grooves 58 can preferably be indented in the tooth flanks 57 in the plastic injection moulding.

LIST OF REFERENCE NUMBERS

1 Steering column
2 Support unit
21 Fastening means
22 Swivel bearing
3 Actuator
31 Casing tube
32 Steering spindle
34 Transmission element
4 Casing unit
41 Adjusting lever
42 Through-passage opening
5, 6 Adjustment drive
51, 61 Spindle nut
52, 62 Threaded spindle
53, 63 Bearing housing
54 Fastening element
55, 65 Drive motor
56 Thread tooth
57 Tooth flank
58 Lubrication groove
590 Tooth tip
591 Tooth base
L Longitudinal axis
H Vertical direction
G Thread axis
U Spacing

What is claimed is:

1. An adjustment drive for a steering column of a motor vehicle, comprising:
   a threaded spindle having an external thread; and
   a spindle nut with an internal threaded that engages with the external thread of the threaded spindle,
   wherein a thread tooth of the external thread and a thread groove of the internal thread have corresponding axially sliding thread flanks that are braced against each other, wherein at least one of the thread flanks comprises a recessed lubricant uptake having an elongated lubrication groove, wherein at least a portion of the recessed lubricant uptake has a spiral shape.

2. The adjustment drive of claim 1 wherein the thread flanks comprise a tooth flank of the thread tooth and/or a groove flank of the thread groove.

3. The adjustment drive of claim 1 wherein the recessed lubricant uptake is axially open at one end.

4. The adjustment drive of claim 1 wherein a plurality of recessed lubricant uptakes are disposed in the at least one of the thread flanks.

5. The adjustment drive of claim 1 wherein the recessed lubricant uptake is a first lubricant uptake, the adjustment drive comprising a second lubricant uptake, wherein the first and second lubrication uptakes are spiral shaped in opposite directions.

6. The adjustment drive of claim 1 wherein the recessed lubricant uptake is one of a plurality of lubricant uptakes that are arranged on one or both tooth flanks of the thread tooth and/or on one or both groove flanks of the thread groove.

7. The adjustment drive of claim 1 wherein the threaded spindle and/or the spindle nut comprises plastic.

8. The adjustment drive of claim 1 wherein the threaded spindle and/or the spindle nut comprises metal.

9. The adjustment drive of claim 1 wherein the recessed lubricant uptake is filled with a lubricant.

10. The adjustment drive of claim 1 comprising a motorized drive unit that is coupled to the threaded spindle or the spindle nut such that the threaded spindle and the spindle nut are configured to be driven in rotation relative to each other.

11. An adjustment drive for a steering column of a motor vehicle, comprising:
    a threaded spindle having an external thread; and
    a spindle nut with an internal threaded that engages with the external thread of the threaded spindle,
    wherein a thread tooth of the external thread and a thread groove of the internal thread have corresponding axially sliding thread flanks that are braced against each other, wherein at least one of the thread flanks comprises a recessed lubricant uptake, wherein the recessed lubricant uptake is a first lubricant uptake, the adjustment drive comprising a second lubricant uptake, wherein the first and second lubrication uptakes are spiral shaped in opposite directions.

12. The adjustment drive of claim 11 wherein the thread flanks comprise a tooth flank of the thread tooth and/or a groove flank of the thread groove.

13. The adjustment drive of claim 11 wherein the recessed lubricant uptake is axially open at one end.

14. The adjustment drive of claim 11 wherein a plurality of recessed lubricant uptakes are disposed in the at least one of the thread flanks.

15. The adjustment drive of claim 11 wherein the recessed lubricant uptake is one of a plurality of lubricant uptakes that are arranged on one or both tooth flanks of the thread tooth and/or on one or both groove flanks of the thread groove.

16. The adjustment drive of claim 11 wherein the threaded spindle and/or the spindle nut comprises plastic.

17. The adjustment drive of claim 11 wherein the threaded spindle and/or the spindle nut comprises metal.

18. The adjustment drive of claim 11 wherein the recessed lubricant uptake is filled with a lubricant.

19. The adjustment drive of claim 11 comprising a motorized drive unit that is coupled to the threaded spindle or the spindle nut such that the threaded spindle and the spindle nut are configured to be driven in rotation relative to each other.

* * * * *